Dec. 6, 1960

T. E. SHELTON 2,963,225

HEATING APPARATUS

Filed Oct. 1, 1956

INVENTOR.
Thayer Ewing Shelton
BY
Thiess, Olsen, Mecklenburger,
von Holst & Coltman Dec. 6, 1960   T. E. SHELTON   2,963,225
HEATING APPARATUS Filed Oct. 1, 1956   6 Sheets-Sheet 5

INVENTOR.
Thayer Ewing Shelton.
BY
Thiess, Olsen, Mecklenburger,
von Holst, & Coltman Attys.

Dec. 6, 1960 T. E. SHELTON 2,963,225
HEATING APPARATUS
Filed Oct. 1, 1956 6 Sheets-Sheet 6

United States Patent Office 2,963,225
Patented Dec. 6, 1960

2,963,225

HEATING APPARATUS

Thayer Ewing Shelton, 115 First National Bank Bldg., Fayetteville, Ark.

Filed Oct. 1, 1956, Ser. No. 613,273

13 Claims. (Cl. 237—2)

This invention relates to improved heating apparatus and more particularly to improved apparatus for providing automatically controlled forced air heat for room areas preferably having an outside wall.

Systems of automatic heating have heretofore been either manually controlled in part or complex in operation and expensive to install. In particular, heating systems for large buildings, such as schools, churches, hospitals, and the like, have utilized a central heating plant with duct work distributing heat to the various rooms and independent controls for modulating both the total output of the system and the hot air provided for each individual space. Necessarily such systems have been complex, requiring skilled operators and excessive maintenance.

It has further been the practice heretofore in large heating installations to provide a modulating motor for continuous infinitely variable control of damper positions in hot air ducts. Such modulating motors are expensive and the controls therefor are complex. Furthermore, such motors tend to continuously hunt, frequently causing irritating variations in the air intake and objectionable noises. Moreover, such central heating plants with expensive distributing duct work have been space-consuming, requiring a separate boiler room, space between the walls for duct work, and especially oriented walls to accommodate the duct work with reasonable efficiency.

It is therefore one object of this invention to provide an improved heating system especially adapted for use in small areas and individual rooms.

It is a further object of this invention to provide an improved room heating unit especially adapted for installation in large buildings, such as schools.

It is still another object of this invention to provide an improved room heating unit requiring a minimum of space for the heating unit and associated duct work while providing optimum distribution of warm air throughout the room at a minimum cost.

It is a further object of this invention to provide an improved control system for room heaters utilizing a minimum number of parts of standard manufacture in a manner enabling an average mechanic to readily and quickly install the system.

It is still another object of this invention to provide an improved heating system capable of more efficient anticipation of room heating needs and more rapid response to variations in such needs.

It is a further object of this invention to provide improved air intake means for a room heating system utilizing conventional louvers in a unique manner to produce greatly simplified and effective operation thereof.

It is still a further object of this invention to provide improved hot air distribution means integrally formed with and cooperating with aesthetic and functional storage facilities.

Further and additional objects of this invention will become apparent from a consideration of this specification, the accompanying drawings, and the appended claims.

In one form of this invention a unique air intake, a forced air blower, a furnace and unique hot air distributing ducts are combined to provide an improved system for heating a small area or a single room. More particularly, a unique air intake including coordinating inside and outside vent means operated by a single control cooperates with a blower, furnace, and a unique hot air distribution system which functions also as wall shelving to provide an aesthetic, efficient, inexpensive, and space-conserving heating system.

For a more complete understanding of this invention, reference will now be made to the accompanying drawings, wherein:

Fig. 17 is a perspective illustration of a mounting bracket forming a part of the duct work illustrated in Fig. 2.

Figure 1:
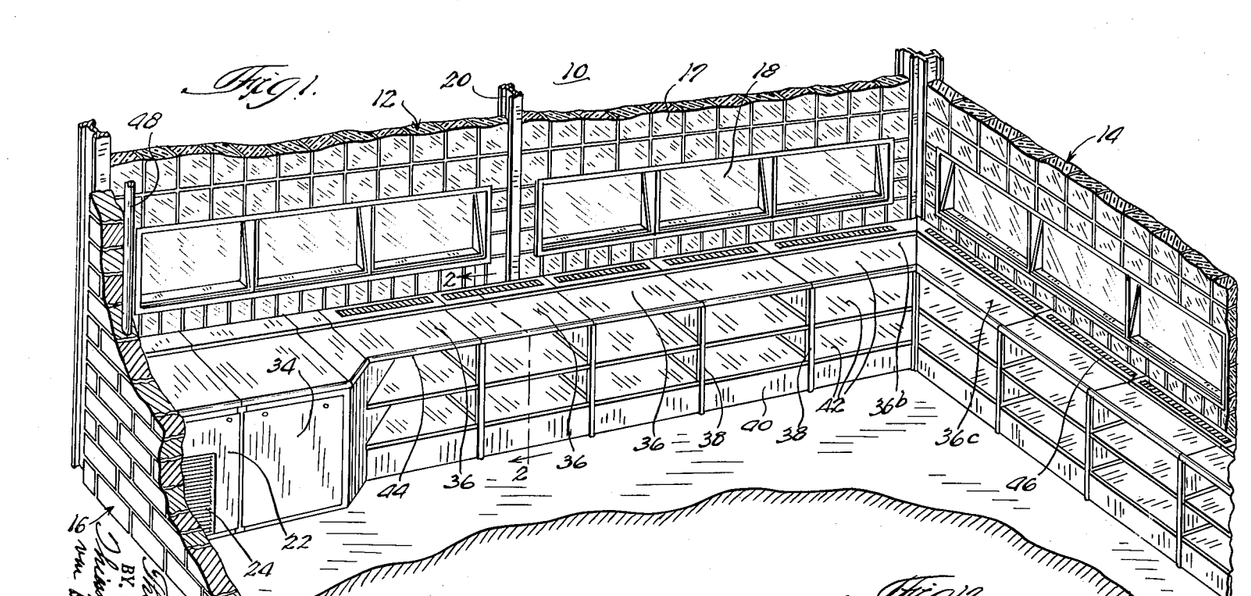
Fig. 1 is a partial perspective view of a school classroom incorporating the novel heating system described herein.

Referring now to the drawings, and more particularly to Fig. 1, a room 10 is illustrated having at least two outside walls 12 and 14. The room 10 furthermore has a third wall 16, partially illustrated, which may be either an inside or an outside wall. Each of the walls 12 and 14 is constructed of masonry in the lower portion thereof and of light-directing glass blocks 17 and windows 18 thereabove. The masonry, glass blocks and windows may be assembled between vertical steel studs 20 substantially as illustrated and described in my Patent No. 2,756,584, issued July 31, 1956.

Figure 5:
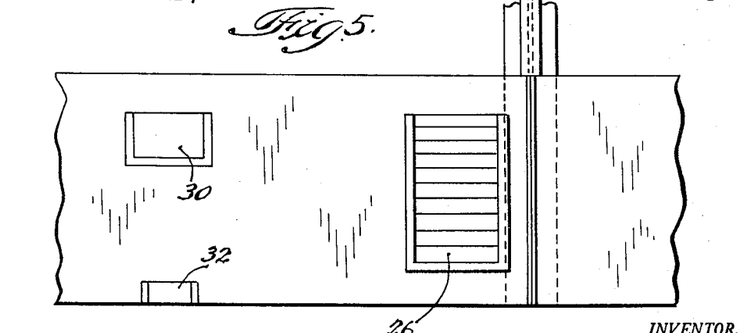
Fig. 5 is a partial elevational view of the heating system of Fig. 1 viewed from outside the area to be heated.

The unique heating system provided by this invention includes an air intake chamber 22 mounted against outside wall 12 and having a louver means 24 communicating with the inside space to be heated and similar louver means 26 shown in Fig. 5 which communicates with the outside atmosphere. The intake chamber 22 is integrally connected to and in communication with a hot air furnace 28. Hot air furnace 28 is provided with a combustion intake opening 30, and preferably has a weep opening 32 which is employed only with LP gas, as illustrated in Fig. 5. The furnace also has an inside access panel 34, as illustrated in Fig. 1. As will be clear from the description which follows, the furnace 28 may be of any conventional type, either of the horizontal type including forced air means or the duct type with which additional blower means is provided.

Figure 6:
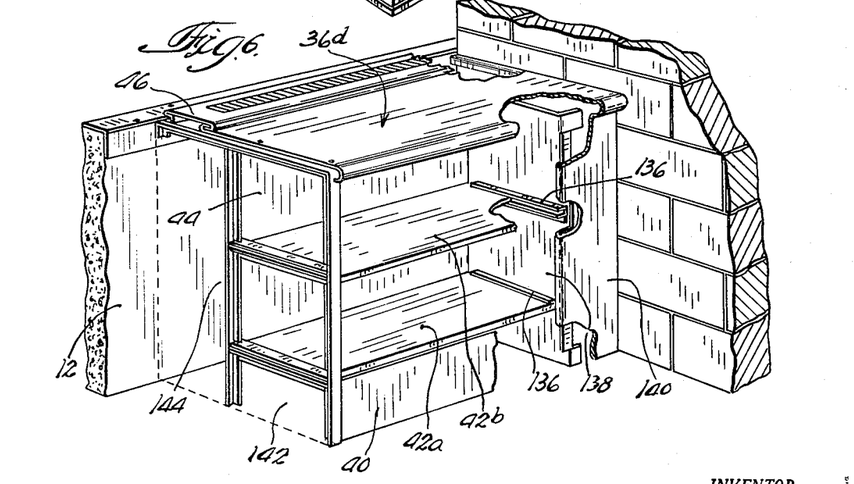
Fig. 6 is a perspective fragmentary view of the terminal portions of the shelf and duct combination illustrated in Fig. 1.

The furnace 28 provides forced hot air to a series of duct sections 36. Each duct section 36 will be identical with the exception of the initial section 36a communicating with the furnace, the corner sections 36b and 36c, and the terminal section 36d, as illustrated in Fig. 6. Each section 36 will be formed between a pair of identical frames 38 and will include a lower front panel 40, a plurality of horizontal shelf panels 42, and a rear panel 44. A horizontal vent portion 46 extends between the upper edge of rear panel 44 and the wall. As will be clear from the description, each of the vent panels 46 is independently adjustable whereby the heating system may be balanced to provide most efficient and comfortable air distribution throughout the room. An exhaust flue 48 is provided and communicates with the furnace and with the outside atmosphere. Conventionally, flue 48 will be a circular pipe having a diameter of the order of four to six inches. This flue carries off the exhaust gases from the furnace 28 which have passed through a heat transfer device to provide warm air for circulation in the room.

While it is preferred that the furnace 28 be a gas-fired furnace, it will be apparent that the instant invention may be applied to furnaces burning natural or artificial gas, liquefied petroleum gas, liquid petroleum, butane, propane, or the like, as well as other conventional fuels.

Figures 2, 7:
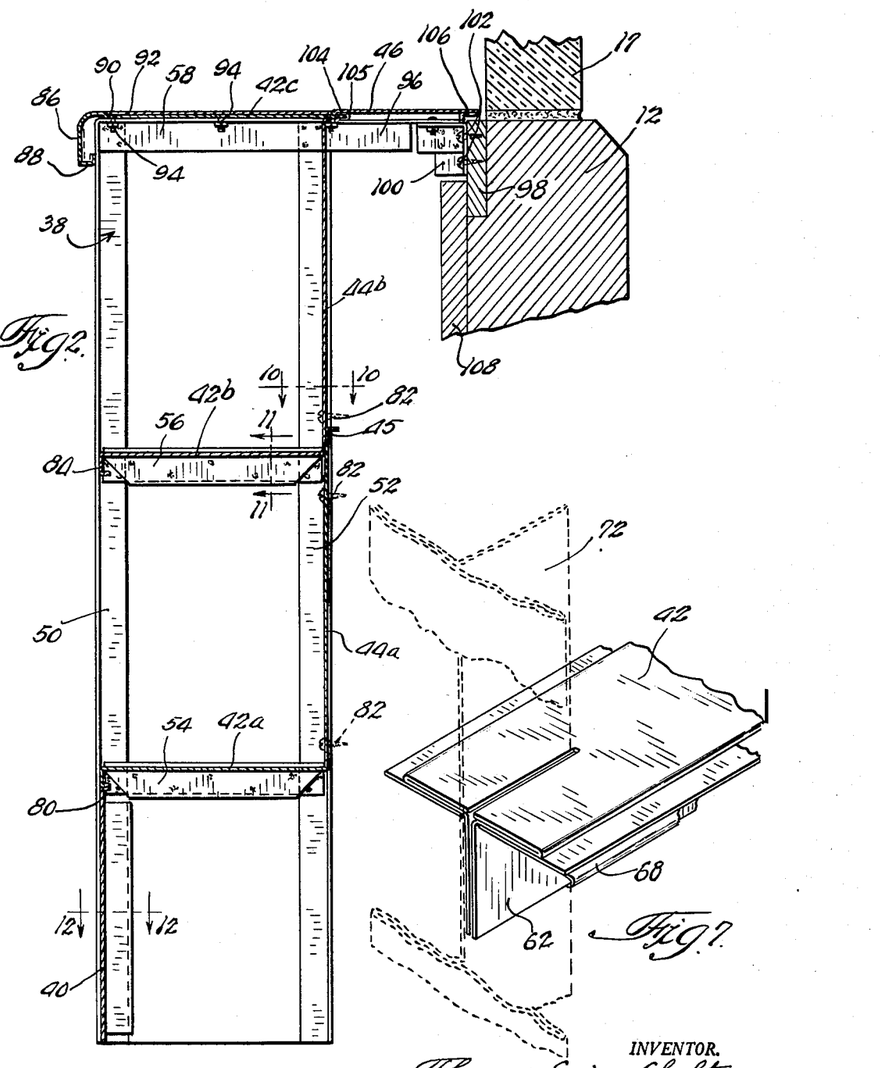
Fig. 2 is a transverse sectional view taken on the line 2—2 of Fig. 1, illustrating the duct work construction utilized therein.
Fig. 7 is a fragmentary view of one frame joint employed with the shelf and duct combination illustrated in Fig. 1.
Figure 3:
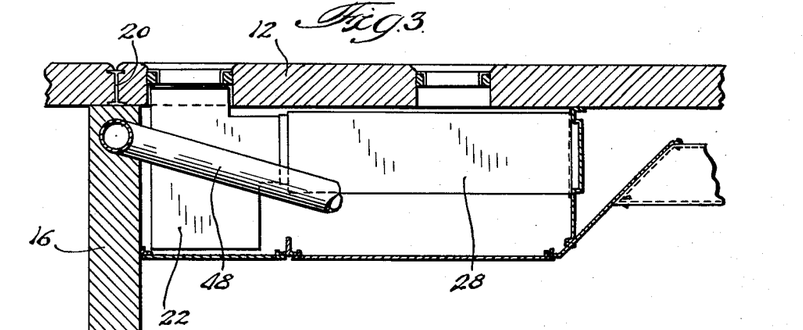
Fig. 3 is a partial top plan view of the air inlet and furnace portions of the heating system illustrated in Fig. 1.
Figure 4:
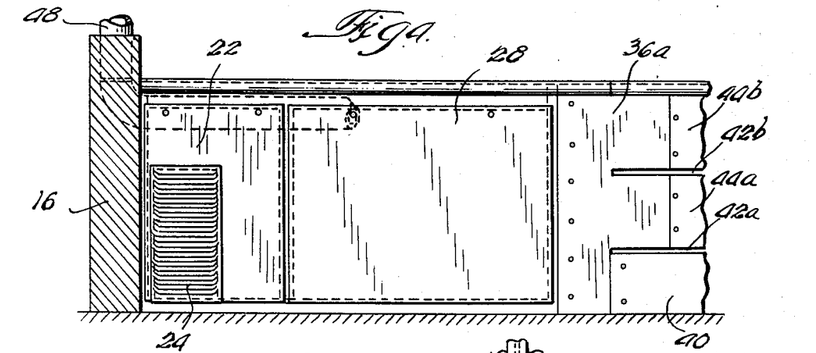
Fig. 4 is a partial elevational view of the heater and intake portions of the embodiment of Fig. 1 viewed from within the area to be heated.
Figure 10:
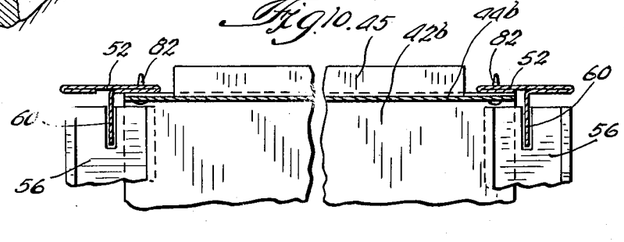
Fig. 10 is a sectional view of the frame illustrated in Fig. 2 taken on the line 10—10 thereof.

Referring now to Fig. 2, the duct and shelf combination forming a part of the instant invention will be described in detail. Each of the frames 38 includes two vertically extending supports 50 and 52 and a plurality of transverse supports 54, 56 and 58 secured between the vertical supports 50 and 52. The supports 50—58 are especially designed for receiving panel sections securely in a field operation in such a manner that the installation of the above-described heating system is greatly facilitated. A transverse section of two rear vertical frame supports 52 and an interposed panel 44b are illustrated in Fig. 10. Therein it can be seen that each vertical support 52 is formed of a single sheet of material folded in the shape of a T, the inwardly extending leg 60 thereof being formed of a single layer of material adapted to receive horizontal supports 56, and the cross arm thereof being folded into a double layer. The horizontal supports 56 may be secured to the vertical supports 52 by welding, bolts, or any other convenient device, as will become clearer from the description which follows.

Figure 11:
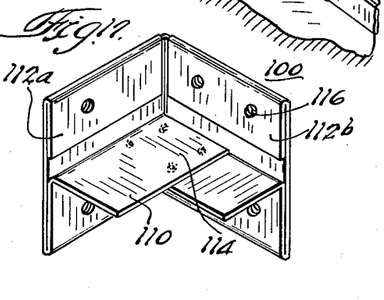
Fig. 11 is a transverse sectional view of the horizontal portion of the frame taken on the line 11—11 of Fig. 2.

The horizontal shelf supports 56 are illustrated in section in Fig. 11. Each horizontal support is constructed of two pieces, each formed generally into the shape of a T section. The first sheet 62 is formed upon itself to provide a double layer downwardly extending leg 64 and a double layer top flange 66. The second sheet forming a part of horizontal support 56 is formed about the inner sheet 62 to provide outer laminations 68 about the downwardly extending leg 64 and base flanges 70 spaced from top flange 66. As illustrated, horizontal panel sections 42 are disposed between the flange 66 and base flange 70 and are resiliently maintained in position by the flanges.

Figures 11, 12, 13:
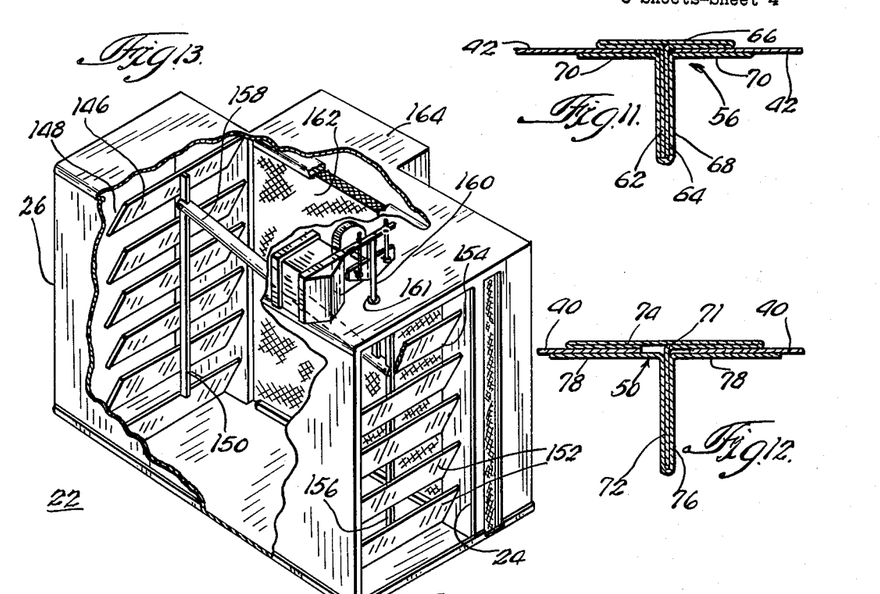
Fig. 12 is a transverse sectional view of the vertical leg of the frame taken on the line 12—12 of Fig. 2.
Fig. 13 is a perspective view of the air inlet means forming a part of the embodiment illustrated in Fig. 1.

The front vertical support 50 is illustrated in section in Fig. 12. The front vertical support section 50 is formed generally in the same manner as horizontal support 56. A first sheet 71 is formed into a T to provide a single layer inwardly extending leg 72 and a double transverse flange 74. Formed over this sheet is a cover sheet including leg portions 76 covering inwardly extending leg 72 and flanges 78 generally parallel to and spaced from double flange 74. As illustrated in Fig. 12, the vertical front panel sections 40 may be forced between the flanges 74 and 78 and resiliently maintained there to form an integral duct assembly.

The manner in which the horizontal shelf supports are secured to the vertical supports 50 and 52 is clearly illustrated in Fig. 7. Therein it can be seen that at the forward end of support 42, the outer leg portion 68 has been cut away at approximately a 45° angle and the inner leg portion 62 spread to receive the vertical inwardly extending leg 72. The assembly thus provided may then be further secured together by welding, bolts, or the like.

Referring once again to Fig. 2, the manner in which the panel sections 40, 42, and 44 are formed is clearly illustrated. It is preferred that the lower front panel 40, the first shelf panel 42a and the lower rear vertical panel portion 44a are integrally formed. If desired, a welded flange joint 80 may be formed to improve the appearance of the duct or to reduce the size of the individual panels required. As already described, the lower front panel 40 and horizontal shelf panel 42a are wedged between spaced flanges on the frame support 38. The rear panel section 44a, however, will be secured to the adjacent supports 38 by sheet metal screws 82 or similar means. The rear panel 44a may extend upwardly beyond shelf 42b and may be provided with a reinforcing flange 45, as shown in Fig. 2.

In the preferred embodiment of this invention the second horizontal shelf 42b is formed with a forward lip 84 to give the shelf a finished, aesthetic appearance and is integrally formed with the upper rear vertical panel section 44b. As already described, the horizontal section 42b is forced between the two spaced flanges of the horizontal support 46, while the upper rear vertical panel 42d is secured to support 52 by sheet metal screws or the like.

The top horizontal panel 42c is provided with a rolled forward lip 86 having a turned flange 88 at the bottom thereof. The panel 42c is also formed with a long wide recess or depression 90 whereby a linoleum or other plastic insert 92 may be provided. Such a composition top provides greater durability and functionality than the unprotected metal panel.

The panel 42c is secured to the frame 38 by cooperating nuts and bolts 94 which are concealed by the composition cover 92. The top horizontal frame section 58 extends rearwardly beyond the vertical support 52 to provide duct spacer 96. The duct spacer 96 is secured to the adjacent outside wall 12 by a nailing strip 98 secured to the wall and a mounting bracket 100 maintained against the nailing strip by a plurality of wood screws 102 or the like. Disposed above and between the spacers 96 are vent panels 46 which have a channel 104 formed at the inner edge thereof to engage a corresponding channel 105 formed in the upper shelf panel 42c. The outer edge 106 has a lip formed therein which will engage the outside wall 12 to provide a neat, tight seal therebetween. The wall 12 will preferably be provided with insulating panels 108 whereby the duct defined by the described structure will be insulated from the outside wall which varies widely in temperature with ambient conditions.

A detailed perspective view of the mounting bracket 100 is shown in Fig. 17. Therein it can be seen that the mounting bracket is formed in a folded T construction having an inwardly extending leg 110 and a flange 112 formed of a double layer of sheet metal. Inwardly extending leg 110 has a transverse central slit formed therein whereby the flange 112 may be folded to form a right angle and whereby the leg 110 has overlapping corner portions 114. The overlapping corner portions 114 may be welded together and the flange portions 112a and 112b provided with appropriate apertures 116 to receive connecting means which engage the nailing strip 98 and top horizontal support 58, as illustrated in Fig. 2.

Figures 8, 9:
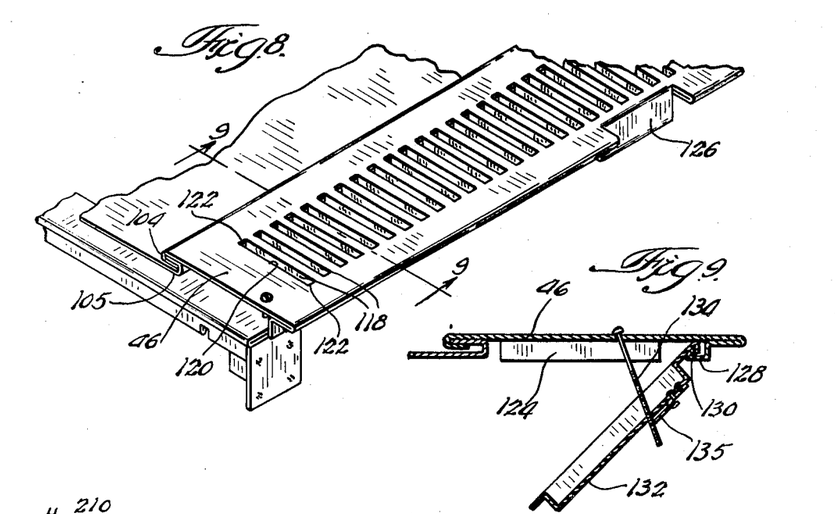
Fig. 8 is a fragmentary view of the vent portion of the shelf and duct combination.
Fig. 9 is a transverse sectional view of the vent portion taken on the line 9—9 of Fig. 8.

The vent 46 is illustrated in more detail in Figs. 8 and 9. Therein it can be seen that the vent is provided with a series of substantially parallel cut-out areas 118. The cut-out areas 118 are formed by cutting a long parallel slit 120 and two parallel transverse slits 122. The material thus defined is formed downwardly to provide a baffle 124 which will deflect warm air passing through the duct upwardly through the elongate slits 118. The portion of the vent panel immediately adjacent the wall has cut-out sections 126 which are formed, as shown in Fig. 8, to accommodate the studs 20 of Fig. 1.

Additionally, the portion of the vent adjacent the wall is formed with an underlying channel 128 and lip 130 which will receive a supplementary adjustable baffle 132. Adjustable baffle 132 is an elongate cover which will enclose a given set of slots 118 is pivotally shifted to the closed position. Normally the adjustable baffle 132 rests in a position substantially as shown in Fig. 9. The baffles hang in the position shown supported by associated threaded supporting bolts 134 which threadedly engage a lug 135. In initially placing the described heating system in operation, the system is balanced by an engineer or skilled mechanic to provide optimum distribution of warm air throughout the room. To accomplish this, the engineer measures the temperature along the outside walls and determines at what points in the room the temperature exceeds the average. At these places, supporting bolts 134, which maintain the baffle 132 in position, are turned to raise the baffle 132 and thus restrict the flow of air from that particular section of the vent indicated by the tests.

It will be apparent that the corner sections 36b and 36c of the combined duct and shelf of this invention will be substantially the same as the remaining sections with the exception that the horizontal shelf panels will be trapezoidal and the support frame will have to be appropriately altered. The terminal section of the combined shelf and duct is illustrated in Fig. 6. Therein it can be seen that U-shaped channels 136 are mounted against an end plate 138 which may be of sheet metal or any other appropriate material. An end closure 140 is also provided to give the duct termination an attractive appearance.

As is apparent from the foregoing description, and particularly from Fig. 6, a very large L-shaped duct area is provided, including the rectangular area 142 under the shelf portion of the structure and the vertical duct area 144 disposed between the outside wall and the upper shelves. Without substantial loss of room area, a very large capacity duct is thereby provided which will reduce the pressure loss in the system, thus raising the efficiency of the plant and reducing the blower requirements.

The unique air inlet chamber and air control means provided by this invention are illustrated in Figs. 13-16. As illustrated in Fig. 13, the chamber 22 is provided with an outside vent 26 and an inside vent 24. Outside vent 26 is provided with a louver comprising a plurality of pivotally mounted covers 146 which are pivoted along a generally central inward longitudinal axis 148. The inner edges of covers 146 are pivotally connected to a rod 150 which insures uniform common movement of all of the louvers 146. The combination of louver covers, inlet area and connecting rod is a common well-known unit in the air conditioning industry.

Disposed at the air inlet means communicating with the room to be heated is a similar louver unit comprising a plurality of covers 152 pivoted along an inner central longitudinal axis 154 and provided with a common pivotal connecting rod 156. However, this unit is mounted in a position inverted with respect to the outside louver unit, whereby, while the outside unit is urged to the closed position by gravity, the inside louver covers 152 are urged to the wide-open position by gravity. Thus rods 150 and 156 are both urged upwardly by the action of gravity on the louver plates, and both ends of a connecting rigid rod 158 are also urged upwardly. The rod 158 is connected to a vertical reciprocable rod 160 which provides driving power for positioning both of the louver means described above. When no vertical forces are applied to rod 160, the rod will be raised by the action of gravity on the louver covers 146 and 152, whereby the outside louver will remain closed and the inside louver in a wide-open position.

Whenever the rod 160 is moved downwardly, outside louver covers 146 are urged to the partially open position while the inside louver plates 152 are partially closed. When the vertical rod 160 is moved downwardly to the maximum extent, the outside louver is fully opened while the inside louver is substantially closed. Thus, a single control is provided whereby both inside and outside air may be modulated in a coordinated manner providing a substantially constant total inlet area with balanced variations in the ratio of inside to outside air. The rod 160 is restrained to provide substantially vertical movement by the housing of chamber 22. A felt washer 161, or the like, may be provided in the aperture in the housing to insure easy movement with minimum wear.

Figure 14:
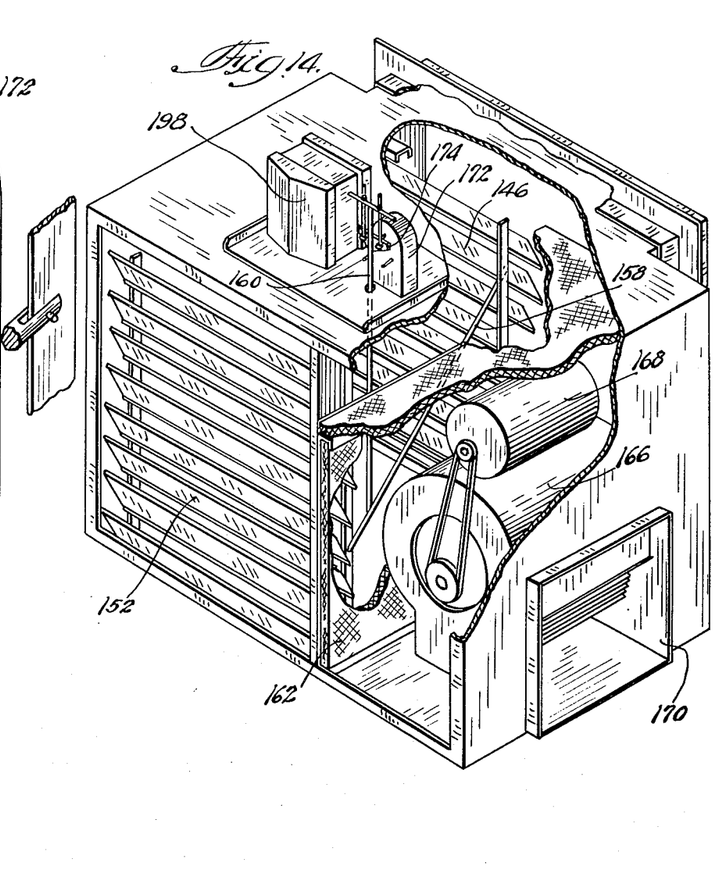
Fig. 14 illustrates a combined air inlet and blower means which may be employed in the embodiment illustrated in Fig. 1.

The air entering the inlet chamber 22 is discharged through a conventional filter 162 and an outlet conduit 164 to the furnace 28 described wtih respect to Fig. 1. In the event that a duct-type furnace is employed which does not include an integral filter and blower unit, the inlet chamber illustrated in Fig. 14 is employed. This chamber is very similar to that described with respect to Fig. 13 and includes an inside air louver 152, an outside air louver 146, a connecting rod 158 and a vertically movable control rod 160. However, at the outlet of the inlet chamber the air passes through filters 162 and is forced by a centrifugal blower 166 driven by motor 168 to flow through a discharge outlet 170 to the duct-type furnace.

Figure 15:
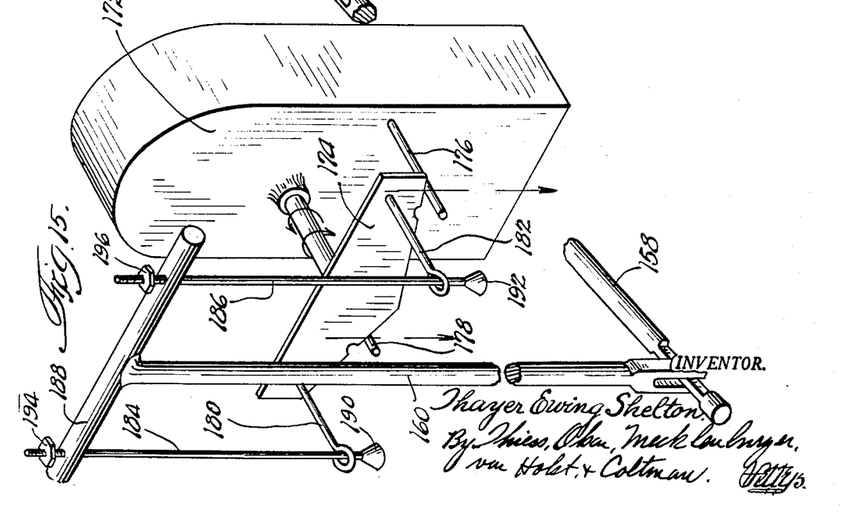
Fig. 15 is a fragmentary view of the motor and controls for the air inlet means illustrated in Figs. 13 and 14.

The means provided for driving the louvers in coordinated relationship in either of the embodiments of Figs. 13 or 14 is the same. A bidirectional motor 172 is mounted above the chamber 22 and has a yoke 174 connected to the output shaft thereof. The yoke 174, as best illustrated in Fig. 15, will, when rotated in either direction, engage a stop 176 or a similar stop 178. Stop 176 will limit clockwise rotation, while stop 178 will limit counterclockwise rotation. Yoke 174 carries with it a pair of eyelets 180 and 182 which slidably receive a pair of louvered drive rods 184 and 186, respectively. The drive rods extend downwardly from a transverse arm 188 mounted at the top of rod 160. Drive rods 184 and 186 have heads 190 and 192 which will engage the eyelets 180 and 182, respectively, while the upper ends of drive rods 184 are threaded and receive adjusting nuts 194 and 196. Thus, downward motion of either eyelet 180 or 182 will force the rod 160 downwardly and open the outside louver while closing the inside louver.

The stops 176 and 178 are so positioned that, upon clockwise rotation of yoke 174, eyelet 182 will draw drive rod 186 downwardly to position rod 160 whereby outside louver 146 is partially open and inside louver 152 is partially closed. The particular ratio of inside to outside air is controlled by adjusting nut 196. In so positioning yoke 174, eyelet 180 freely slides over drive rod 184 providing lost motion between these two parts. When motor 172 is energized to drive yoke 174 in a counterclockwise direction the yoke will engage limit stop 178 at a position such that eyelet 180 will draw drive rod 184 downwardly to position outside louver 146 in the substantially fully opened position. Again, lost motion is provided between eyelet 182 and drive rod 186 whereby the device may function without this connection limiting the over-all movement of drive rod 160.

A control box 198 is mounted adjacent motor 172 above inlet chamber 22 to control energization of motor 172 in a manner which will be described in more detail with regard to Fig. 16. The system herein described is especially adapted for use in heating schoolrooms. It has been found that optimum efficiency and the most desirable atmospheric conditions can be obtained within a classroom by circulating fresh air throughout the classroom from a time shortly prior to the entry of students in the morning until the departure of the students at the end of the day. Furthermore, for maximum efficiency it is desirable that no fresh air be introduced into the schoolroom during the period when classes are not in session, but instead, inside air is merely heated and recirculated. Thus, in accordance with this invention, the continuously energized timer motor 200 mounted in housing 198 will operate timer switch means, as schematically illustrated in Fig. 16.

Figure 16:
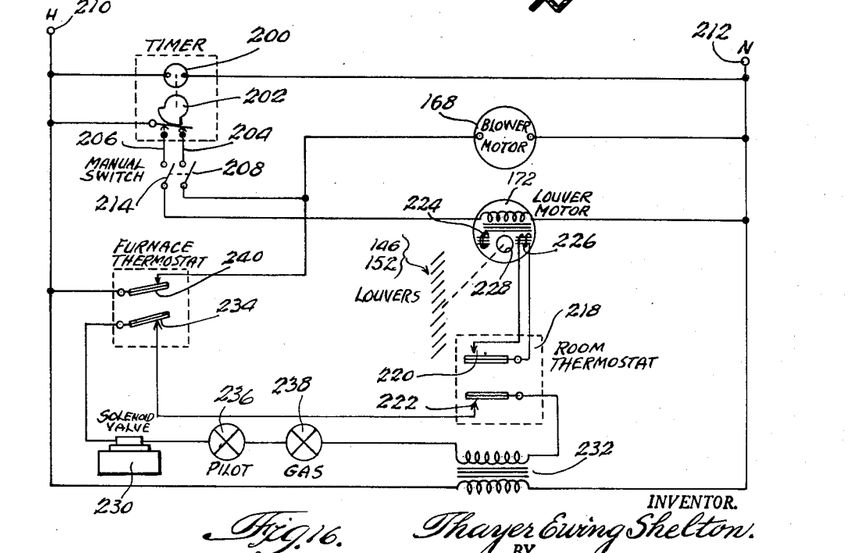
Fig. 16 is a schematic circuit diagram of the manner in which the various components described herein are electrically wired in cooperative relationship.

As illustrated in Fig. 16, a cam 202 closes a pair of contacts 204 and 206 for a predetermined time during each twenty-four-hour period. This, for example, might be from 8:00 a.m. to 3:00 p.m. During the remainder of the time, switches 204 and 206 remain open. Switch 204 is in series with the manual switch 208 and blower motor 168, and this series combination is connected between the high voltage terminal 210 and the neutral terminal 212. Thus, blower motor 168 is continuously energized during the normal class day. Furthermore, switch 206 is connected in series with manual switch 214 and the field winding of the louver motor 176. This combination is also connected between terminals 210 and 212 whereby louver motor 176, which is a conventional shaded pole A.C. induction motor, will be driven to produce clockwise motion of yoke 174 to position both louvers 146 and 152 in the partially open positions. Thus, under normal daytime conditions, the blower 168 is operating and the inside and outside louvers are partially open.

As a general rule, it is found desirable under these conditions to introduce ten to twenty percent of fresh air through the outside louver while recirculating eighty to ninety percent of the inside air. A room thermostat 218, schematically illustrated in Fig. 16, will be positioned in the classroom at a point determined by experimentation. The thermostat 218 contains two thermally sensitive switches 220 and 222. Switch 220 will close whenever the temperature in the room exceeds a predetermined maximum, for example 78°, while switch 222 will close whenever the temperature in the room falls below a predetermined temperature, for example 66°.

As already mentioned, louver motor 176 is a shaded pole induction motor having, for example, a copper ring 224 associated with the field winding. One particular motor employed with this invention provides an additional shading winding 226 which, when shorted, will cause reverse motion of the motor armature 228 whereby the yoke 174 moves in a counterclockwise direction to fully open the outside louver 146 and fully close the inside louver 152. While this particular motor is suggested as one convenient example, it will be clear that any reversible motor may be employed, or two independent motors operating unidirectionally may be employed. The particular motor utilized is adapted for continuous energization, though motion of the motor is limited by stops 176 and 178. If it is preferred, motors may be employed with limit switches whereby proper positioning of the louvers will open appropriate switches and de-energize the louver motor temporarily. If, following closure of switch 220 and consequent maximum opening of louvers 146, the room temperature falls below the predetermined maximum, the switch 220 will open and the motor 216 will reverse to again position both louvers 146 and 152 in the partially open positions.

In the event that the temperature of the room falls below the level defined by switch 222, that switch will close, whereby a 24-volt solenoid valve 230 will open to actuate heater 28 and provide fuel thereto. Twenty-four-volt valve 230 will be energized from the secondary of a 24-volt transformer 232, the primary of which is connected between terminals 210 and 212. It will be apparent that while most conventional valves for use with gas-fired furnaces employ a 24-volt system, any appropriate valve may be substituted therefor.

Connected in series with thermostat switch 222, the secondary of transformer 232, and solenoid valve 230, are safety switches 234, 236, and 238. While any safety device considered desirable or required by local law may be utilized with this system, the ones particularly suggested here are a pilot switch 236 which will open in the event that the pilot flame is extinguished, a gas pressure switch 238 which will open in the event the gas pressure falls below a predetermined level, and a furnace chamber thermostatic switch 234 which will open in the event that the furnace chamber becomes overheated. The latter may occur, for example, if the blower motor 168 becomes inoperative, whereby the furnace heat is not properly circulated.

A second switch 240 is provided in the furnace thermostat, and this switch is connected in parallel with timer switch 204 and in series with blower motor 168. Thus furnace switch 240 provides proper night operation even though switch 204 is inoperative. When timer switch 204 is open during the night, and room thermostat 218 indicates a sub-minimum temperature, the heater 28 will be actuated, raising the furnace temperature and closing switch 240. Closure of switch 240 under night conditions will energize blower motor 168, and the blower will continue to function after thermostatic switch 222 opens until furnace thermostatic switch 240 indicates that the furnace chamber temperature is reduced below a predetermined level. In one conventional installation, furnace thermostat 240 is made to close at approximately 110° F. and to reopen at approximately 95° F., while furnace safety switch 234 is adapted to open at approximately 190° F.

The manual switches 208 and 214 are conventionally combined in a double pole, single throw, wall-mounted toggle switch, and are especially useful for sub-zero and week-end operation. Unless the timer mechanism is adapted for a long cycle including special provisions for week-end operation, the manual switches 208 and 214 will be opened during week ends or vacations, whereby the outside louver will remain closed at all times and heating will be performed at maximum efficiency by merely recirculating inside air. Furthermore, in the event that during sub-zero weather conditions the system is unable to adequately heat the area, the manual switches 208 and 214 may be opened, whereby night conditions will prevail and no cold outside air will be injected into the system.

In summary, this invention provides a unique and novel system for room heating in which an integral inlet chamber, furnace blower, and combined shelf and duct cooperate to produce an efficient, aesthetic, and inexpensive system which will closely maintain desired temperatures within a large room area having an outside wall.

While the systems illustrated in the accompanying drawings are described in detail in this specification, it will be clear to one skilled in this art that various modifications may be incorporated without departing from the spirit and scope of this invention. For example, without difficulty an air cooling system may be directly incorporated into the school heating system without in any way altering the basic concepts herein described. It is preferred, in placing a cooling unit in this system, that the cooling unit receive air from the heating unit to avoid condensation in the heating unit and consequent damage thereto. Other similar variations in either mechanical construction, controls, or operation will occur to men skilled in this art, and they are believed to form a part of this invention.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Space heating apparatus for a room having an outside wall surface comprising an air heater means, a blower communicating with said air heater means, air conduit means communicating with said heater means and having discharge openings over a major portion of such outside wall surface, outside vent means providing communication with outside air and with the inlet to said air heater means and blower, inside vent means providing communication with said space and the inlet of said air heater means and blower, and control means including outside louver means mounted pivotally off-balance to incline to a fully closed position, inside louver means mounted pivotally off-balance inverse to the outside louver means to incline to a fully open position, connecting means including a bar pivotally connected at the inside louver means and the outside louver means to reciprocally operate said vent means whereby the total inlet capacity of said inside and outside vent means remains substantially constant, bidirectional motor means driving said connecting means in the same direction irrespective of the direction of said motor, stop means providing operation of said motor in a first direction partially opening said outside louver and operation of said motor in a second direction substantially fully closing said inside louver, timing means for energizing said motor means in said first direction and energize said blower, and space temperature sensing means for operating said motor means in said second direction whenever the temperature of said space exceeds a predetermined value.

2. Space heating apparatus for a room having an outside wall surface comprising an air heater means, a blower communicating with said air heater means, air conduit means communicating with said heater means and having discharge openings over a major portion of such outside wall surface, outside vent means providing communication with outside air and with the inlet to said air heater means and blower, inside vent means providing communication with said space and the inlet of said air heater means and blower, and control means including outside louver means mounted pivotally off-balance to incline to a fully closed position, inside louver means mounted pivotally off-balance inverse to the outside louver means to incline to a fully open position, connecting means including a bar pivotally connected at the inside louver means and the outside louver means to reciprocally operate said vent means whereby the total inlet capacity of said inside and outside vent means remains substantially constant, bidirectional motor means driving said connecting means in the same direction irrespective of the direction of said motor, stop means providing operation of said motor in a first direction partially opening said outside louver and operation of said motor in a second direction substantially fully closing said inside louver, timing means for energizing said motor means in said first direction and energize said blower, and space temperature sensing means for operating said motor means in said second direction whenever the temperature of said space exceeds a predetermined value and for energizing said air heater means whenever said temperature is below a predetermined level.

3. Space heating apparatus for a room having an outside wall surface comprising an air heater means, a blower communicating with said air heater means, air conduit means communicating with said heater means and having discharge openings over a major portion of such outside wall surface, outside vent means providing communication with outside air and with the inlet to said air heater means and blower, inside vent means providing communication with said space and the inlet of said air heater means and blower, and control means including outside louver means mounted pivotally off-balance to incline to a fully closed position, inside louver means mounted pivotally off-balance inverse to the outside louver means to incline to a fully open position, connecting means including a bar pivotally connected at the inside louver means and the outside louver means to reciprocally operate said vent means whereby the total inlet capacity of said inside and outside vent means remains substantially constant, bidirectional motor means driving said connecting means in the same direction irrespective of the direction of said motor, stop means providing operation of said motor in a first direction partially opening said outside louver and operation of said motor in a second direction substantially fully closing said inside louver, timing means for energizing said motor means in said first direction and energize said blower, control means in said air heater means to energize said blower whenever the temperature in said air heater means rises to a preselected value, and space temperature sensing means for operating said motor means in said second direction whenever the temperature of said space exceeds a predetermined value and for energizing said air heater means whenever said temperature is below a predetermined level.

4. Space heating apparatus for a room having an outside wall surface comprising an air heater means, a blower communicating with said air heater means, air conduit means communicating with said heater means and having discharge openings over a major portion of such outside wall surface, said conduit means comprising a substantially horizontal, erect, rectangular passageway extending along said wall surface, a substantially horizontal rectangular passageway extending along the floor adjacent said wall surface and communicating with said erect passageway over substantially their entire length, an outlet disposed along substantially the entire upper edge of said erect passageway, said passageway being otherwise substantially sealed, and a plurality of overlying spaced shelves disposed inwardly from said erect passageway and above said communicating passageway, outside vent means providing communication with outside air and with the inlet to said air heater means and blower, inside vent means providing communication with said space and the inlet of said air heater means and blower, and control means including outside louver means mounted pivotally off-balance to incline to a fully closed position, inside louver means mounted pivotally off-balance inverse to the outside louver means to incline to a fully open position, connecting means including a bar pivotally connected at the inside louver means and the outside louver means to reciprocally operate said vent means whereby the total inlet capacity of said inside and outside vent means remains substantially constant, bidirectional motor means driving said connecting means in the same direction irrespective of the direction of said motor, stop means providing operation of said motor in a first direction partially opening said outside louver and operation of said motor in a second direction substantially fully closing said inside louver, timing means for energizing said motor means in said first direction and energize said blower, control means in said air heater means to energize said blower whenever the temperature in said air heater means rises to a preselected value, and space temperature sensing means for operating said motor means in said second direction whenever the temperature of said space exceeds a predetermined value and for energizing said air heater means whenever said temperature is below a predetermined level.

5. In space heating apparatus having a heater for an area including an outside wall, an inlet unit comprising a chamber having a first inlet adapted for communication with outside air, a second inlet for communication with the space to be heated, and an outlet communicating with such heater, outside louver means pivotally mounted to substantially close said first inlet, inside louver means to substantially close said second inlet and pivotally mounted off-balance to incline to a fully open position, rigid means including a bar pivotally connected at the inside louver means and the outside louver means interconnecting the portions of said louvers extending into said chamber, rod means pivotally connected to said rigid means intermediate said louvers and secured in said chamber for substantially longitudinal movement, bidirectional motor means driving said rod means in a single direction irrespective of the direction of movement of said motor means, and lost motion means connecting said rod means to said motor means whereby motion of said motor means in one direction will move said rod means longitudinally to partially open said outside louver means and partially close said inside louver means and movement in the opposite direction will substantially fully open said inside louver means and fully close said outside louver means.

6. In space heating apparatus having a heater for an area including an outside wall, an inlet unit comprising a chamber having a first inlet adapted for communication with outside air, a second inlet for communication with the space to be heated, and an outlet communicating with such heater, outside louver means pivotally mounted to substantially close said first inlet, inside louver means to substantially close said second inlet and pivotally mounted off-balance to incline to a fully open position, rigid means including a bar pivotally connected at the inside louver means and the outside louver means interconnecting the portions of said louvers extending into said chamber, rod means pivotally connected to said rigid means intermediate said louvers and secured in said chamber for substantially longitudinal movement, bidirectional motor means driving said rod means in a single direction irrespective of the direction of movement of said motor means, stop means associated with said motor means limiting motion thereof in each direction, and lost motion means connecting said rod means to said motor means whereby motion of said motor means against said stop means in one direction moves said rod means longitudinally to partially open said outside louver means and partially close said inside louver means, and motion of said motor means in the opposite direction moves said rod means longitudinally to substantially fully open said outside louver means and substantially fully close said inside louver means.

7. The apparatus of claim 6 including a timer switch means and thermostatic switch means wherein said timer switch means periodically operates the motor in said one direction and said thermostatic switch means operates the motor in the opposite direction whenever the temperature of such space exceeds a predetermined level.

8. The apparatus of claim 6 including timer switch means and thermostatic switch means wherein said timer switch means periodically operates the motor in said one direction, said thermostatic switch means operates the motor in the opposite direction whenever the temperature of such space exceeds a predetermined level, and said thermostatic switch means operates said heater whenever the temperature of such space is below a predetermined value.

9. The apparatus of claim 8 including a heater temperature switch connected in cooperative relationship with said timer switch means whereby said heater temperature switch senses the temperature of said heater and energizes said blower whenever the temperature of said heater is above a preselected value.

10. In space heating apparatus an air heater and a blower for emitting heated air to an area including a floor surface and a substantially vertically disposed wall surface, air duct means comprising a plurality of frame members secured to such wall surface and defining a first vertical plane substantially parallel to and spaced from said wall surface, a second substantially vertical plane substantially parallel to and spaced from said first plane, and a plurality of generally horizontal planes parallel to and spaced above said floor surface, sheet material covering said second plane from said floor surface to the first of said horizontal planes, sheet material covering said first vertical plane from said first horizontal plane to the top of said frames, sheet material covering each of said horizontal planes, said frame member and sheet material defining shelving and variable vent means secured between said first vertical plane and said wall surface whereby an L shaped horizontal heated air duct is defined by said wall surface, floor surface, the covered portion of said second vertical plane, first horizontal plane, and said first vertical plane and said vent means, and each of said covered horizontal planes comprises an integrally formed shelf, the air duct means being in communication with the heater and blower, and the heated air emitted from the blower being in heat transfer relationship with the entire floor and wall surfaces defining portions of the air duct means.

11. The apparatus of claim 10 wherein each element of said frame comprises spaced web members adapted to receive and maintain said sheet material therebetween to form an integral assembly.

12. The apparatus of claim 11 wherein three substantially horizontal planes are defined by said frames, the sheet material covering said second vertical plane from said floor surface to said first horizontal plane, covering said first horizontal plane, and covering said first vertical plane between said first and the second horizontal planes being formed of a single sheet of metal, the material covering said second horizontal plane and said first vertical plane between said second and the third horizontal planes being formed of a single sheet of metal, and said vent means and said covering for the third horizontal plane being secured together as a single sheet, said above sheets being secured together over substantially their entire length.

13. In a space heating apparatus for a room including a floor surface and a substantially vertically disposed outside wall surface, an air blower unit, inlet means providing communication through said wall surface to the outside, a heater unit in communication with said blower and said inlet means, air duct means for transmitting air along said wall only from said heater, said inlet means, blower, heater and air duct means being connected seriatim whereby air is forced through said heater from said inlet means and into said horizontal duct means by said blower, said duct means being elongate and extending over substantially the entire length of said wall and having an L-shaped cross section including a vertical portion along said wall and a horizontal portion along said floor, vent means disposed generally continuously along the uppermost surface of said duct means over the major portion of the length of said wall, and deflector means disposed along said vent means to regulate the horizontal movement of heated air from said heater through said duct means and to deflect the air moving horizontally along said outside wall surface vertically upward adjacent selected areas of said wall.

References Cited in the file of this patent

UNITED STATES PATENTS 1,939,916     Otto _________________ Dec. 19, 1933

(Other references on following page)

UNITED STATES PATENTS

| | | |
|---|---|---|
| 2,009,782 | Maurer | July 30, 1935 |
| 2,019,991 | Nilson | Nov. 5, 1935 |
| 2,151,512 | Hagen | Mar. 21, 1939 |
| 2,213,956 | Drake | Sept. 10, 1940 |
| 2,235,500 | Kitchen | Mar. 18, 1941 |
| 2,257,007 | Harris | Sept. 23, 1941 |
| 2,271,487 | Nessell | Jan. 27, 1942 |
| 2,273,260 | Guler | Feb. 17, 1942 |
| 2,334,445 | Seelbach | Nov. 16, 1943 |
| 2,594,477 | Miner | Apr. 29, 1952 |
| 2,622,806 | Simmons et al. | Dec. 23, 1952 |
| 2,696,948 | McElgin | Dec. 14, 1954 |
| 2,775,432 | McElgin | Dec. 25, 1956 |

OTHER REFERENCES

Automatic Control of Heating and Air Conditioning (Haines), published by McGraw-Hill Book Co. Inc., 1953, New York, page 180 relied on.